United States Patent
Yilmaz et al.

(10) Patent No.: US 10,433,268 B2
(45) Date of Patent: Oct. 1, 2019

(54) CALCULATING TIMING OFFSET IN WIRELESS COMMUNICATIONS

(71) Applicant: Telefonaktiebolaget LM Ericsson (publ), Stockholm (SE)

(72) Inventors: Osman Nuri Can Yilmaz, Espoo (FI); Erik Eriksson, Linköping (SE); Martin Hessler, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 128 days.

(21) Appl. No.: 15/547,653

(22) PCT Filed: Feb. 2, 2015

(86) PCT No.: PCT/EP2015/052101
§ 371 (c)(1),
(2) Date: Jul. 31, 2017

(87) PCT Pub. No.: WO2016/124220
PCT Pub. Date: Aug. 11, 2016

(65) Prior Publication Data
US 2018/0027511 A1  Jan. 25, 2018

(51) Int. Cl.
*H04L 12/801* (2013.01)
*H04L 12/751* (2013.01)
(Continued)

(52) U.S. Cl.
CPC ......... *H04W 56/001* (2013.01); *H04L 5/0007* (2013.01); *H04L 7/0033* (2013.01); *H04W 56/0045* (2013.01); *H04W 56/0095* (2013.01)

(58) Field of Classification Search
CPC ............. H04W 55/001; H04W 56/005; H04W 60/005; H04L 7/0033
See application file for complete search history.

(56) References Cited

U.S. PATENT DOCUMENTS 8,102,754 B2   1/2012  Baldemair et al.
8,682,585 B1*  3/2014  Hoff .......... H02S 50/10
                                                702/3
(Continued)

FOREIGN PATENT DOCUMENTS

EP   2498542 A1   9/2012

OTHER PUBLICATIONS

RACH-less handover in synchronized network, Alcatel Lucent (Year: 2007).*
(Continued)

*Primary Examiner* — John D Blanton
*Assistant Examiner* — Abusayeed M Haque
(74) *Attorney, Agent, or Firm* — Patent Portfolio Builders, PLLC

(57) ABSTRACT

A device operates in a cellular communications network by detecting a timing signal from a serving base station, obtaining timing information from at least one other base station, and setting a value for a transmission time offset based on the detected timing signals from the serving base station and the at least one other base station. The device then transmits signals to the serving base station using the set value for the transmission time offset. The device may obtain the timing information from at least one other base station by detecting a timing signal transmitted by the at least one other base station, and subtracting the timing difference between the detected timing signals from the serving base station and the one other base station from a predetermined baseline time offset.

24 Claims, 5 Drawing Sheets

(51) Int. Cl.
*H04L 5/14* (2006.01)
*H04L 29/06* (2006.01)
*H04W 56/00* (2009.01)
*H04L 5/00* (2006.01)
*H04L 7/00* (2006.01)

(56) References Cited

U.S. PATENT DOCUMENTS

| | | | |
|---|---|---|---|
| 2004/0246923 A1 | 12/2004 | Achard | |
| 2005/0047416 A1* | 3/2005 | Heo | H04W 8/24 370/395.4 |
| 2011/0294532 A1* | 12/2011 | Ambrosy | H04W 24/02 455/517 |
| 2012/0314640 A1* | 12/2012 | Kim | H04L 5/001 370/311 |
| 2013/0010964 A1* | 1/2013 | Fong | H04L 5/0053 380/277 |
| 2013/0154693 A1* | 6/2013 | Moeglein | H04W 52/0229 327/143 |
| 2014/0148213 A1* | 5/2014 | Tinnakornsrisuphap | H04W 16/08 455/522 |
| 2014/0173319 A1* | 6/2014 | Zeng | G06F 11/3013 713/340 |
| 2015/0131569 A1* | 5/2015 | Rosa | H04L 1/0026 370/329 |
| 2015/0268328 A1* | 9/2015 | Johnson | G01S 7/03 342/21 |
| 2017/0127321 A1* | 5/2017 | Wang | H04W 28/14 |

OTHER PUBLICATIONS

Unknown, Author, "RACH-less Handover in synchronized networks", 3GPP TSG-RAN WG 2 #58bis LTE, R2-072655, Jun. 25-29, 2007, 1-3.

Office Action issued in application No. 15701986.0; dated Jan. 30, 2019; 05 pages.

* cited by examiner

CALCULATING TIMING OFFSET IN WIRELESS COMMUNICATIONS

TECHNICAL FIELD

This relates to a wireless mobile communications network, and in particular to a method for allowing a device to obtain timing information relating to a base station in the network.

BACKGROUND

In order for a device in a wireless mobile communications system to be able to transmit signals that can be received by a base station in the network, it is often necessary for the device to transmit signals at specific times. The base station typically allocates specific time slots in which it can receive signals transmitted by devices, and so it is necessary for the devices to transmit those signals at times that take account of the time taken for the signal to propagate from the device to the base station.

Typically, there is a synchronization mechanism, by which a device can determine this propagation delay, and establish a value for a transmission time offset, so that it transmits its signals at times that ensure that the signals are received by the base station within the correct time window.

However, the synchronization mechanism takes a certain period of time, and requires messages to be exchanged between the device and the base station.

In some situations, it is advantageous for the device to be able to send messages with very low latency. For example, a sensor device may be configured so that it sends an alarm message when certain conditions are detected. Because the conditions are rare, the sensor device may not remain actively connected to the network. However, when the alarm conditions are detected, the alarm message should be sent with low latency and high reliability.

SUMMARY

According to a first aspect of the present invention, there is provided a method of operation of a device in a cellular communications network. The method comprises: detecting a timing signal from a serving base station, obtaining timing information from at least one other base station, and setting a value for a transmission time offset based on the detected timing signals from the serving base station and the at least one other base station. The device then transmits signals to the serving base station using the set value for the transmission time offset.

According to a second aspect of the present invention, there is provided a user equipment device, for use in a cellular communications network. The device is configured for: detecting a timing signal from a serving base station, obtaining timing information from at least one other base station, setting a value for a transmission time offset based on the detected timing signals from the serving base station and the at least one other base station, and transmitting signals to the serving base station using the set value for the transmission time offset.

According to a third aspect of the present invention, there is provided a method of operation of a base station in a cellular communications network. The method comprises: instructing a device to detect a timing signal from said base station, obtain timing information from at least one other base station, set a value for a transmission time offset based on the detected timing signals from said base station and the at least one other base station, and transmit signals to said base station using the set value for the transmission time offset.

According to a fourth aspect of the present invention, there is provided a base station for use in a cellular communications network. The base station is configured for: instructing a device to detect a timing signal from said base station, obtain timing information from at least one other base station, set a value for a transmission time offset based on the detected timing signals from said base station and the at least one other base station, and transmit signals to said base station using the set value for the transmission time offset.

According to a fifth aspect of the present invention, there is provided a computer program product, comprising a computer-readable storage medium containing instructions for causing a device to perform a method according to the first or hird aspect.

This allows the device to send a message to the base station without first needing to perform a synchronization procedure.

DETAILED DESCRIPTION

Figure 1:
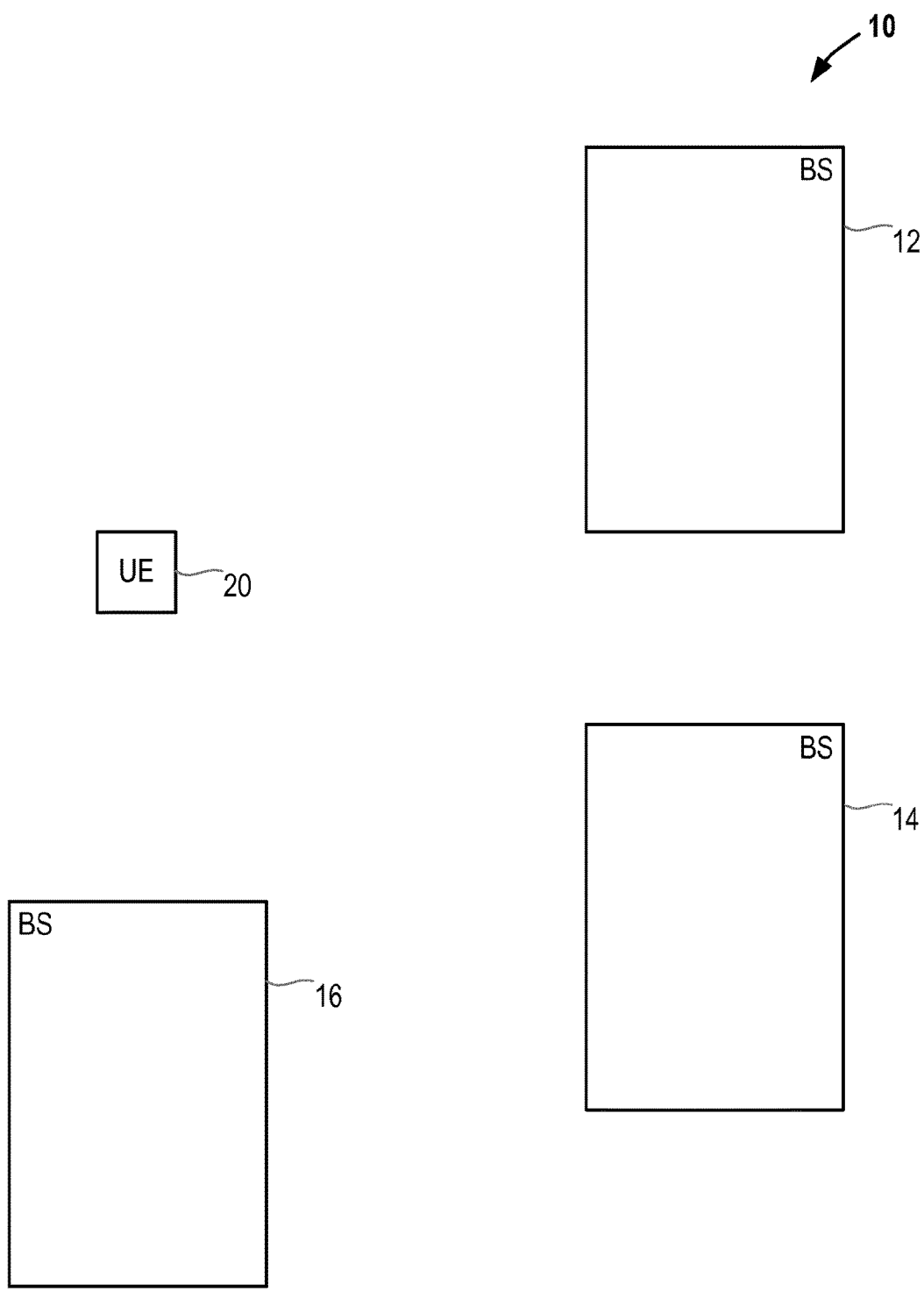
FIG. 1 shows a part of a communications network.

FIG. 1 illustrates a part of a communications network 10, comprising three base stations 12, 14, 16, and a user equipment (UE) device 20.

The base stations 12, 14, 16 provide coverage for devices in their respective cells, and are typically connected to a core network of the communications network 10, allowing those devices to establish connections to other compatible devices.

The device 20 is able to connect to the base station in whose coverage area it is located, but may also be able to detect signals transmitted by other base stations. The device 20 may take the form of a portable communications device such as a cellular phone, but may also take the form of a user device that is generally intended to remain in a fixed location, or may take the form of a device that automatically connects to the network when it has data to send. For example, a sensor may be provided at a fixed location, with the intention that it should transmit an alarm message, or sensor data, either at fixed time intervals or when an alarm condition is detected.

Figure 2:
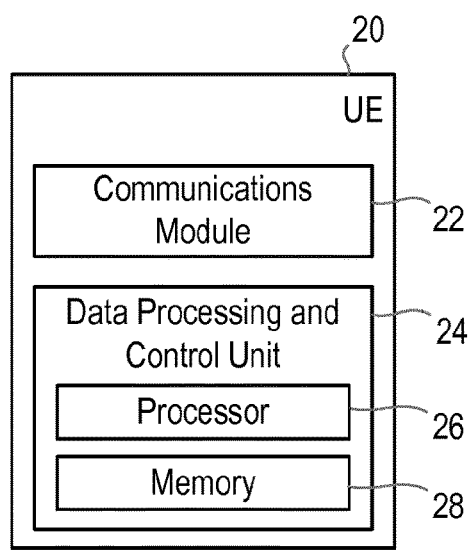
FIG. 2 shows a device from the network of FIG. 1.

FIG. 2 shows the form of the device 20. Specifically, the device 20 includes a communications module 22 and a data processing and control unit 24. The data processing and control unit 24 includes a processor 26 and a memory 28. The processor 26 performs data processing and logical operations, and the memory 28 stores working data and program instructions for causing the processor to perform the methods described herein. The communications module 22 generates signals in a suitable form for transmission in accordance with a suitable communications standard, and also receives signals that have been transmitted in accordance with a suitable communications standard, and extracts data from the received signals.

Figure 3:
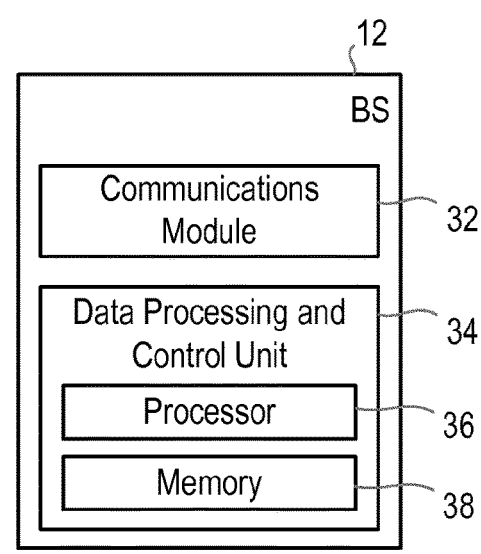
FIG. 3 shows a base station from the network of FIG. 1.

FIG. 3 shows the form of the base station 12, although it will be appreciated that the base stations 14, 16 are of generally similar form. Thus, the base station 12 includes a communications module 32 and a data processing and control unit 34. The data processing and control unit 34 includes a processor 36 and a memory 38. The processor 36 performs data processing and logical operations, and the memory 38 stores working data and program instructions for causing the processor to perform the methods described herein. The communications module 22 generates signals in a suitable form for transmission in accordance with a suitable communications standard, and also receives signals that have been transmitted in accordance with a suitable communications standard, and extracts data from the received signals.

Figure 4:
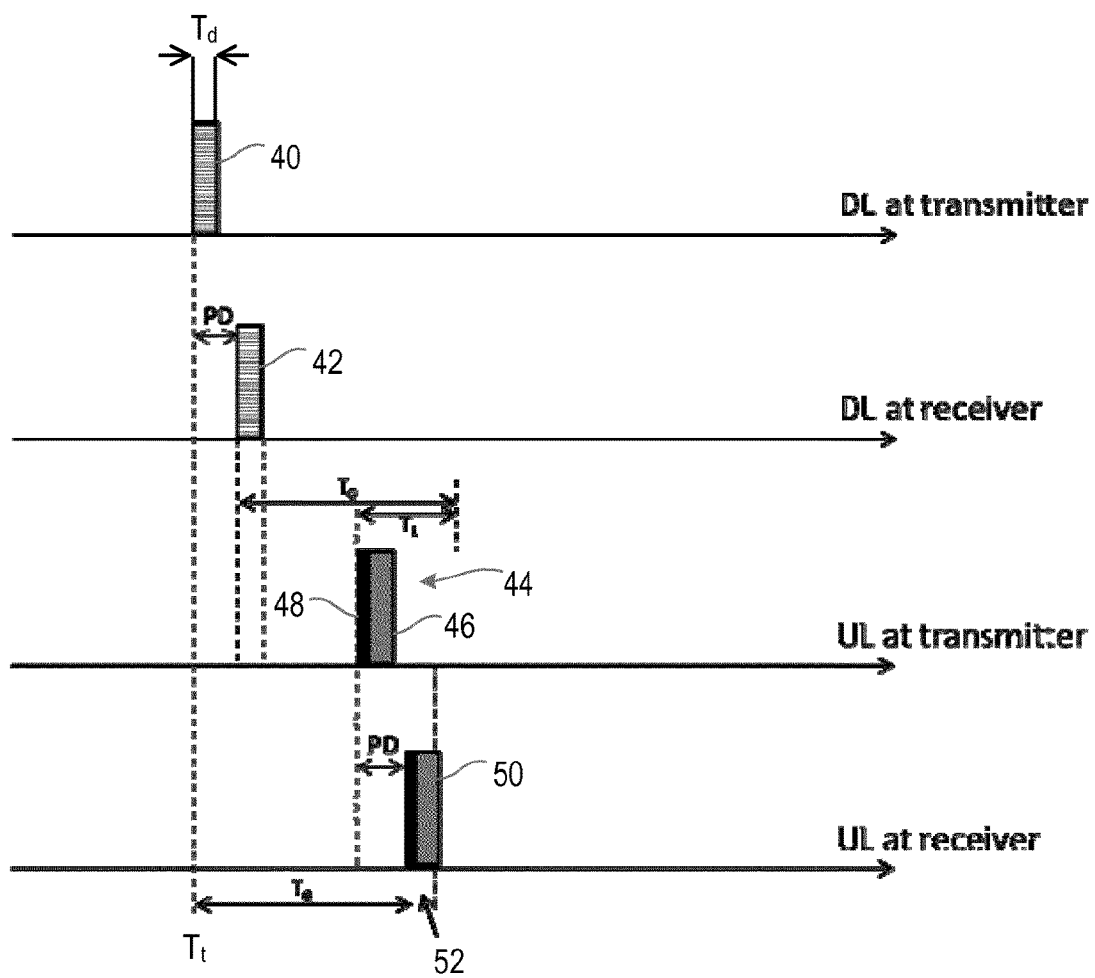
FIG. 4 shows the timing of signals in the network of FIG. 1.

FIG. 4 illustrates the situation with which the method is concerned. Thus, FIG. 4 shows a signal 40 being transmitted on the downlink, that is, from a base station such as the base station 12, at a time $T_t$. In this illustrated example, the transmitted signal is an Orthogonal Frequency Division Multiplexed signal with a symbol duration of $T_d$.

FIG. 4 then shows the same signal 42 being received on the downlink, at a device such as the device 20. In this illustrated situation, the propagation delay, that is, the time taken for the radio signal to travel the distance between the transmitter and the receiver, is indicated as PD.

FIG. 4 then shows a signal 44 being transmitted on the uplink, that is, from a device such as the device 20. In this illustrated example, the signal 44 contains a data component 46 and a cyclic prefix 48. The cyclic prefix 48 repeats a part of the data component 46. This has the effect that, provided that the signal is received within a certain time window, it can be successfully demodulated, even if it is not received at precisely the intended time. In this example, the ideal reception time for the uplink receiver, that is the base station, to receive the signal is at a time $T_0$ later than the time at which it transmitted the signal 40. The effect of the cyclic prefix is that the signal can be successfully demodulated, provided that it is received in the base station within a window preceding the ideal reception time, where that window has a duration equal to the cyclic prefix length, CP.

Thus, the reception window starts at the time $(T_t+T_0-CP)$ and ends at the time $(T_t+T_0)$.

FIG. 4 also shows, indicated by the reference numeral 50, the signal that was transmitted on the uplink, being received at the receiving node such as the base station 12.

Again, there is a propagation delay of PD between the timing of the transmitted signal 44 and the received signal 50.

The time window 52 is the time window within which the signal 50 must be received, in order to be successfully demodulated.

The device 20 knows the time at which it receives the signal on the downlink, and it knows that the signal on the uplink must be received within the specified time window after the signal was transmitted on the downlink.

It therefore sets a transmission time offset, or timing advance, $T_1$, such that it transmits signal 44 at a time $(T_0-T_1)$ after it receives the signal 42 in the downlink. The selected value of $T_1$ must therefore compensate both for the propagation delay of the downlink signal and the propagation delay of the uplink signal, which may be assumed to be equal.

Therefore, the signal 50 on the uplink is received at the base station at the time $(T_t+PD+T_0-T_1+PD)$, and $T_1$, must be set such that this is within the reception window from the time $(T_t+T_0-CP)$ to the time $(T_t+T_0)$.

Thus, it is necessary for the transmission time offset, or timing advance, $T_1$, to be in the range from $2*PD$ to $(2*PD+CP)$.

Figure 5:
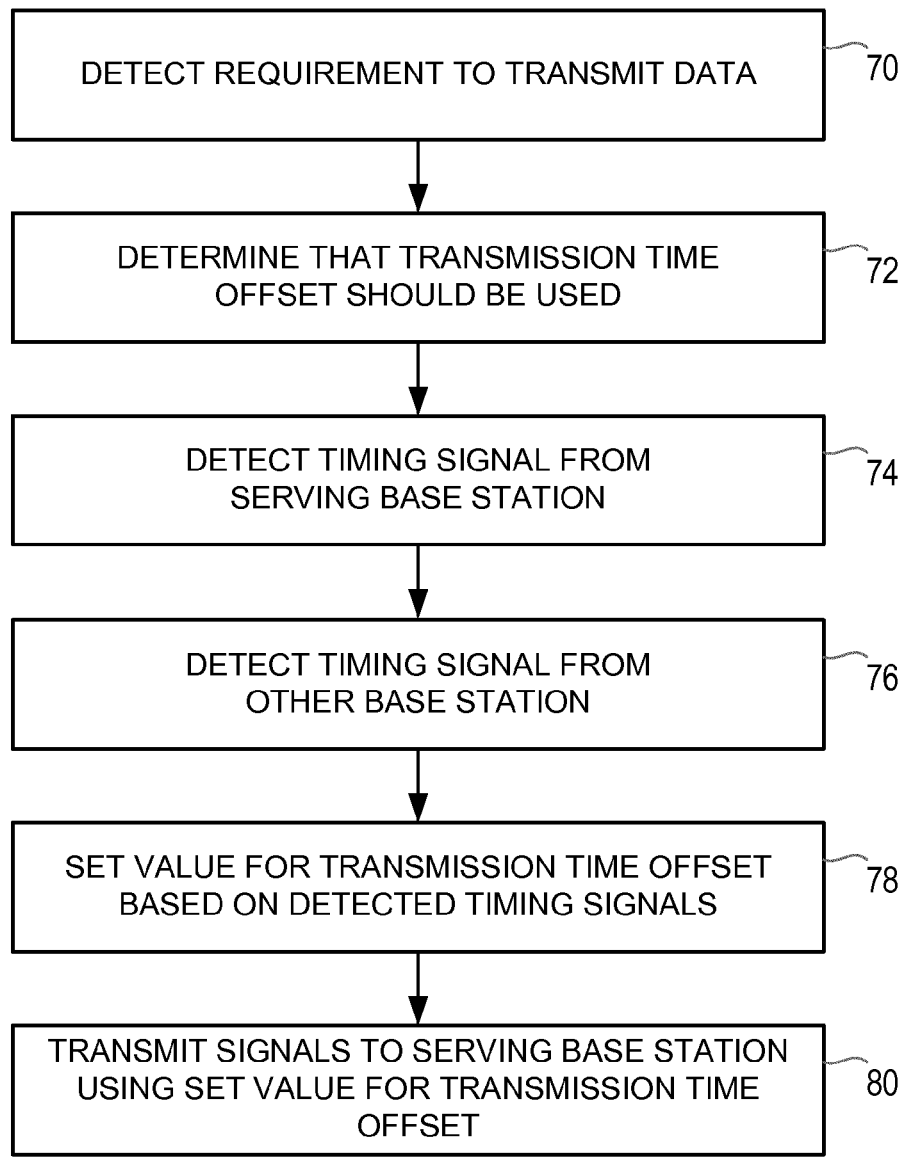
FIG. 5 is a flow chart, illustrating a method performed in a device.

FIG. 5 is a flow chart, illustrating a method performed in a device such as the device 20.

In step 70, the device determines that it has data to send to the base station. For example, in the case of a sensor, this may be because the sensor is programmed to report measurement values at predetermined intervals. Alternatively, it may be because an alarm condition has been detected, and it is necessary to send an alarm message to the base station. The alarm message may also include the measured parameter values that gave rise to the alarm condition.

In step 72, the device determines that it should use an estimated value for a transmission time offset. For example, if the data to be transmitted is not time-critical, it may be considered more efficient to perform a synchronization process, in order to be certain that the data is transmitted with the correct timing.

In some embodiments, the process for estimating a value for the transmission time offset is only used within a certain predetermined time period after the device last received a timing advance command from the base station. That period may start at a time later than the time at which the device last received the timing advance command from the base station. In some embodiments, the process for estimating the value for the transmission time offset is only used if the received signal strength of one or multiple downlink signals exceeds a predetermined threshold value.

In some embodiments, the process for estimating a value for the transmission time offset is used only when explicitly signalled by the serving base station, for example on initial configuration of the device or when setting up a bearer for a special type of service. The process may also be triggered by other factors such as a device moving into a specific area or identifying a service performed by the device that may require short latency.

In some embodiments, the process for estimating a value for the transmission time offset may be used in dependence on the type of data to be transmitted. For example, high priority data may be sent over a channel using an estimated timing advance, while lower priority data triggers a random access procedure to gain uplink synchronization.

The method is then concerned with a situation in which the device requires access to the base station, without being synchronized on the uplink. In some embodiments, this uses an uplink timing estimate that is based on an assumption of propagation delay reciprocity. That is, the propagation delay on the downlink is the same as the propagation delay on the uplink. This implies that the device 20 can base its estimate of the transmission time offset (uplink timing advance) on measurements that it makes on the downlink.

In practice, the effective cyclic prefix duration sets an upper limit on the timing error that can be handled in the receiving device, such as the base station in this example. In this context, the term "effective cyclic prefix duration" refers to the part of the length of the cyclic prefix that is not needed for dealing with multipath propagation. That is, one function of the cyclic prefix is to allow a receiving device to handle signals that are received over a multipath, for example with an echo. Provided that the cyclic prefix is longer than the longest received echo, the remaining part of the cyclic prefix, the effective cyclic prefix duration, provides a margin within which a timing error can be handled.

If the base station serves a small cell, then the maximum propagation delay to any device within the cell will be small, and so the device can know the actual propagation delay to within a small margin. It can then set its transmission time offset so that, with the propagation delay, the signal is received at the base station within the required time window.

However, if the cell is larger, such that the propagation delay is large compared to the effective cyclic prefix, it is necessary to use a better value for the transmission time offset.

In this illustrative example, it is assumed that the device 20 is able to detect signals from at least two base stations along a respective "line of sight". In this context, a "line of sight" is defined as the propagation condition that a radio signal moves straight from the transmitter to the receiver, e.g. even if this radio path passes through a wall etc. The following example also assumes that the base stations of the cellular network transmit synchronized (positioning) reference signals. Further, it is assumed here that the radio network transmits a node specific maximum propagation delay parameter relating to a set of positioning reference signals.

Then, in step 74 of the method shown in FIG. 5, the device detects one of the synchronized reference signals transmitted by the base station to which the device wishes to transmit data, that is, its serving base station. The synchronized reference signal has a known timing, relative to the timing of the window within which any signal transmitted by the device 20 must be received by the base station.

In step 76 of the method shown in FIG. 5, the device detects one of the synchronized reference signals transmitted by at least one other base station. As mentioned above, it is assumed that the reference signal transmitted by the or each other base station was transmitted at exactly the same time as the detected signal transmitted by the serving base station.

In step 78, a value for the transmission time offset is then set, based on these detected reference signals. More specifically, in one embodiment, the value for the transmission time offset is set based on a difference between the arrival times of the signals.

Figure 6:
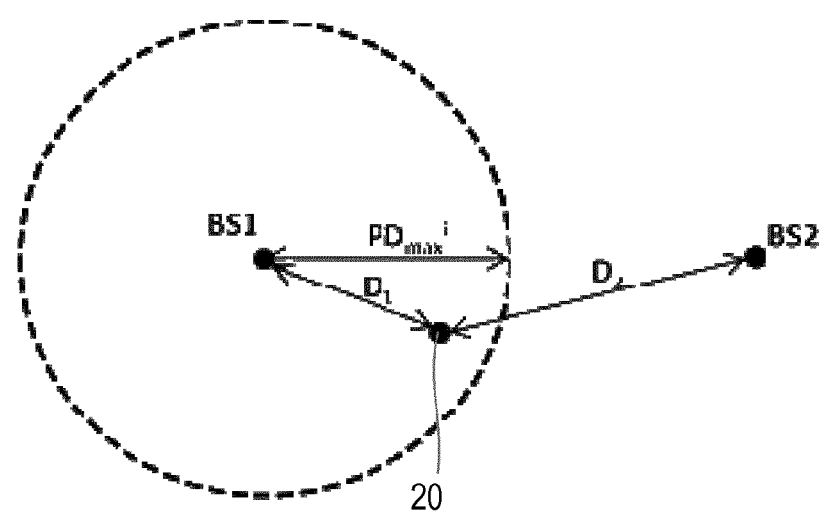
FIG. 6 illustrates a step in the method of FIG. 5.

FIG. 6 illustrates a situation in which a device 20 detects signals transmitted by a first, serving, base station BS1 and by a second base station BS2. In this illustrated example, the device 20 detects the signal transmitted by the serving base station BS1 after a propagation delay D1, and detects the signal transmitted by the second base station BS2 after a propagation delay D2. However, the device 20 typically has no way to determine the values for D1 and D2. Rather, the device 20 is able to measure a value for the time difference $D_{RS2}$ between the times at which the device 20 detects the signals transmitted by the serving base station BS1 and the signal transmitted by the second base station BS2. Therefore, $D_{RS2}=(D2-D1)$.

Further, it is assumed here that the device 20 has a value for at least one node specific maximum propagation delay parameter $PD_{max}^i$, which effectively sets the size of the cell served by the base station BS1, relative to other base stations. Thus, in this case the device 20 has a value for a parameter $PD_{max}^2$, which effectively sets the size of the cell served by the base station BS1, relative to the base station BS2.

In some embodiments of the invention, the value of $PD_{max}^i$ is configured by the device 20 using system broadcast information. In other embodiments, the value is configured to the device using dedicated signaling, e.g. using RRC or MAC control signaling. In other embodiments the device calculates a value of $PD_{max}^i$ when it receives a timing advance command from the base station when it is operating in synchronized mode. In some embodiments, the device calculates a value of $PD_{max}^i$ based on a current measurement of the time difference $D_{RS2}$ and a currently configured timing advance. In some embodiments the device may calculate a value before going into discontinuous reception mode, that is, the mode in which it may need to send data without first performing synchronization.

In this situation, the device 20 sets a value for its transmission time offset $T_1$ based on the cyclic prefix duration, CP, which is assumed to be the required transmission time offset when there is zero propagation delay, and based on the time difference $D_{RS2}$ and the node specific maximum propagation delay parameter $PD_{max}^i$.

Specifically:

$$T_1=CP+(PD_{max}^2-D_{RS2}).$$

Although, in this specific example, the term CP is used, referring to the cyclic prefix duration, the value for the transmission time offset can be calculated using a modified term that takes account of the fact that it is not possible to have zero propagation delay, and to provide a margin for timing errors. However, in many cases, a reasonable value of this term will be close to the cyclic prefix length.

Thus, more generally, the value for the transmission time offset $T_1$ can be calculated as:

$$T_1=CP''+(PD_{max}^2-D_{RS2}),$$

where $CP''=CP+\Delta$, and $\Delta$ is a suitable correction factor.

In a situation in which the device 20 detects signals transmitted by the first, serving, base station BS1 and by multiple second base stations BSi, it detects the signal transmitted by the serving base station BS1 after a propagation delay D1, and detects the signals transmitted by the second base stations BSi after respective propagation delays D1. The device 20 then measures multiple values for the time differences $D_{RSi}$ between the times at which the device 20 detects the signals transmitted by the serving base station BS1 and the signals transmitted by the respective second base station BSi. Therefore, $D_{RSi}=(Di-D1)$.

In this situation, the measurement that provides the minimum time difference is used.

That is:

$$T_1=\max(CP, CP+\max(PD_{max}^i-D_{RSi})).$$

Again, the term CP can be replaced by $(CP+\Delta)$, as above.

If the device is unable to detect any other base station, for example it is unable to detect signals from any other base station with a signal strength above a predetermined threshold, then the method does not provide a useful result and is automatically deactivated.

If, for some reason, the measurements are in error, such that they would produce a negative value for the timing offset, the use of the "max" function ensures that the calculation produces a timing offset of CP (or $(CP+\Delta)$), as a worst case.

Thus, in these illustrated examples, the value for the transmission time offset is set based on a predetermined baseline time offset and on the timing difference between the detected timing signals from the serving base station and one other base station.

In some embodiments, the value for the transmission time offset is set based in part also on the path loss with which the device 20 receives the signals from the serving base station, and optionally also from at least one other base station, using the feature that, in general terms, the path loss between a base station and a receiving device will increase with the distance of the device from the base station.

Having set the value for the transmission time offset, in step 80 the device transmits the required data to the serving base station. The signal transmitted to the serving base station may additionally include a demodulation pilot for use by the serving base station, but it is not necessary for the device to perform a synchronization procedure.

The signal transmitted in step 80 can be transmitted with a power that is set based on a degree of uncertainty in the value of the transmission time offset. This degree of uncertainty could for example depend on the time from last time alignment and/or the number of "other base stations" used in calculating the transmission time offset correction. When time alignment is performed, the device has a value for the transmission time offset that is assumed to be acceptably accurate. The longer the time since this was performed, the higher probability that the device has moved and that the value is no longer accurate. Also, it is possible to move to locations at which the actual propagation delay changes, but the measured time difference is unchanged. If additional "other base stations" are used, that possibility is reduced.

Timing errors risk the possibility of inter-symbol interference between transmissions received by the base station, due to the loss of orthogonality between them. Therefore, when there is a higher degree of uncertainty in the calculation of the value of the transmission time offset, there is a greater risk of this interference, and so the transmission power is reduced to reduce the effects of this interference.

Additionally, in some embodiments, the device can report the measured time difference. In addition, in some embodiments the device reports to the base station statistics relating to failed transmissions that occur when it is using an estimated value of the transmission time offset. In some embodiments the base station estimates the timing errors experienced when using estimated values of the transmission time offset. In such embodiments, the base station can determine whether, and when, to configure devices to use the process for setting the transmission time offset value, based on such reports from devices. In some embodiments the base station forwards statistics about estimated TA to an Operations and Maintenance node, which can itself make decisions about the use of the process, based on these statistics.

In the examples of the method described above, the value for the transmission time offset is set based on information relating to timing signals obtained from the serving base station and at least one other base station.

In some embodiments, it may be possible to obtain a value for a timing advance for a serving base station, using available timing advance information, for example timing advance information relating to one of the other base stations.

For example, one example of this is when there is a split, or separation, between the uplink and the downlink. For example, a device might have an uplink connection through one cell (for example a small cell, to allow critical data to be transmitted), and a downlink connection through a different cell (for example a macro cell, providing a best-effort service). In this case, assuming that the two cells are synchronized on their downlink, provided that the device knows the timing advance information relating to one of the cells, it can estimate the timing advance within the other cell based on the timing difference between signals that it receives on the downlink from the two cells. In this case, receiving one downlink signal sample from each cell would be sufficient for the timing advance estimation.

There is thus described a method by which the device can obtain useful timing information, such that it may be possible to transmit data to a serving base station without first performing an uplink synchronization procedure.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

Embodiments

1. A method of operation of a device in a cellular communications network, comprising: detecting a timing signal from a serving base station, obtaining timing information from at least one other base station, setting a value for a transmission time offset based on the detected timing signals from the serving base station and the at least one other base station, and transmitting signals to the serving base station using the set value for the transmission time offset.

2. A method as in 1, wherein obtaining the timing information from at least one other base station comprises detecting a timing signal transmitted by the at least one other base station.

3. A method as in 2, comprising setting the value for the transmission time offset based on the detected timing signals from the serving base station and the at least one other base station by determining a timing difference between the detected timing signals from the serving base station and the at least one other base station.

4. A method as in 3, comprising setting the value for the transmission time offset based on the detected timing signals from the serving base station and one other base station by subtracting the said timing difference between the detected timing signals from the serving base station and the one other base station from a predetermined baseline time offset.

5. A method as in 3, comprising: detecting the timing signal from a plurality of other base stations, for each of the other base stations, determining a respective timing difference between the detected timing signal from the serving base station and the detected timing signal from the other base station, and determining a maximum one of said respective timing differences, and setting the value for the transmission time offset by subtracting the maximum one of said respective timing differences from a predetermined maximum propagation delay.

6. A method as in 4 or 5, comprising receiving a value for the predetermined maximum propagation delay in a broadcast message.

7. A method as in 4 or 5, comprising receiving a value for the predetermined maximum propagation delay in a dedicated signalling message.

8. A method as in 4 or 5, comprising calculating a value for the predetermined maximum propagation delay.

9. A method as in 1, 2, 3, 4 or 5, comprising setting the value for the transmission time offset taking account of a length of a cyclic prefix in the or each transmission.

10. A method as in any of 1-9, comprising setting said value for a transmission time offset, and transmitting signals to the serving base station using the set value for the transmission time offset, in response to determining that data to be transmitted has a high priority.

11. A method as in any of 1-10, comprising setting said value for a transmission time offset, and transmitting signals to the serving base station using the set value for the transmission time offset, only within a predetermined time period after receiving a timing advance command.

12. A method as in any of 1-11, comprising setting said value for a transmission time, and transmitting signals to the serving base station using the set value for the transmission time offset, only when explicitly signalled by the serving base station.

13. A method as in any of 1-12, comprising setting said value for a transmission time, and transmitting signals to the serving base station using the set value for the transmission time offset, only when the device is able to detect timing signals from at least a predetermined number of other base stations with a signal strength at least equal to a predetermined signal strength.

14. A method as in any of 1-13, comprising reporting the set value for the transmission time offset to the serving base station.

15. A method as in any of 1 to 14, comprising: transmitting signals to the serving base station with a power that is determined based on an uncertainty in the set value for the transmission time offset.

16. A user equipment device, for use in a cellular communications network, the device being configured for: detecting a timing signal from a serving base station, obtaining timing information from at least one other base station, setting a value for a transmission time offset based on the detected timing signals from the serving base station and the at least one other base station, and transmitting signals to the serving base station using the set value for the transmission time offset.

17. A user equipment device as in 16, being configured for obtaining the timing information from at least one other base station by detecting a timing signal transmitted by the at least one other base station.

18. A user equipment device as in 17, being configured for setting the value for the transmission time offset based on the detected timing signals from the serving base station and the at least one other base station by determining a timing difference between the detected timing signals from the serving base station and the at least one other base station.

19. A user equipment device as in 18, being configured for setting the value for the transmission time offset based on the detected timing signals from the serving base station and one other base station by subtracting the said timing difference between the detected timing signals from the serving base station and the one other base station from a predetermined baseline time offset.

20. A method of operation of a base station in a cellular communications network, comprising: instructing a device to detect a timing signal from said base station, obtain timing information from at least one other base station, set a value for a transmission time offset based on the detected timing signals from said base station and the at least one other base station, and transmit signals to said base station using the set value for the transmission time offset.

21. A method as in 20, comprising instructing said device by means of a broadcast message.

22. A method as in claim 20, comprising instructing said device by means of dedicated signalling.

23. A base station for use in a cellular communications network, the base station being configured for: instructing a device to detect a timing signal from said base station, obtain timing information from at least one other base station, set a value for a transmission time offset based on the detected timing signals from said base station and the at least one other base station, and transmit signals to said base station using the set value for the transmission time offset.

24. A computer program product, comprising a computer-readable storage medium containing instructions for causing a device to perform a method as in any of 1 to 15 or 20 to 22.

A user equipment device, for use in a cellular communications network, comprises:
a detecting module, for detecting a timing signal from a serving base station,
an obtaining module, for obtaining timing information from at least one other base station,
a setting module, for setting a value for a transmission time offset based on the detected timing signals from the serving base station and the at least one other base station, and
a transmitting module, for transmitting signals to the serving base station using the set value for the transmission time offset.

The invention claimed is:

1. A method of operation of a device in a cellular communications network, the method comprising:
    detecting a timing signal from a serving base station;
    obtaining timing information from at least one other base station;
    setting a value for a transmission time offset based on the detected timing signal from the serving base station and the timing information obtained from the at least one other base station; and
    transmitting signals to the serving base station using the set value for the transmission time offset, wherein transmitting the signals to the serving base station comprises transmitting the signals to the serving base station with a power that is determined based on an uncertainty in the set value for the transmission time offset.

2. The method as claimed in claim 1, wherein obtaining the timing information from the at least one other base station comprises detecting a timing signal transmitted by the at least one other base station.

3. The method as claimed in claim 2, wherein setting the value for the transmission time offset based on the detected timing signals from the serving base station and the at least one other base station comprises determining a timing difference between the detected timing signals from the serving base station and the at least one other base station.

4. The method as claimed in claim 3, wherein setting the value for the transmission time offset based on the detected timing signals from the serving base station and the at least one other base station further comprises:
    subtracting the timing difference between the detected timing signals from the serving base station and the at least one other base station from a predetermined baseline time offset; and
    setting the value of the transmission time offset based on a resulting value of the subtracting.

5. The method as claimed in claim 3, wherein the at least one other base station is a plurality of other base stations,
    wherein detecting the timing signal transmitted by the at least one other base station comprises detecting a timing signal from each of the plurality of other base stations,
    wherein determining the timing difference comprises, for each of the plurality of other base stations, determining a respective timing difference between the detected timing signal from the serving base station and the detected timing signal from the respective other base station, and determining a maximum one of the respective timing differences, and wherein setting the value for the transmission time offset further comprises:

subtracting the maximum one of the respective timing differences from a predetermined maximum propagation delay; and setting the value of the transmission time offset based on a resulting value of the subtracting.

6. The method as claimed in claim 5, further comprising receiving a value for the predetermined maximum propagation delay in a broadcast message.

7. The method as claimed in claim 5, further comprising receiving a value for the predetermined maximum propagation delay in a dedicated signaling message.

8. The method as claimed in claim 5, further comprising calculating a value for the predetermined maximum propagation delay.

9. The method as claimed in claim 1, wherein setting the value for the transmission time offset based on the detected timing signal from the serving base station and the timing information obtained from the at least one other base station comprises setting the value for the transmission time offset further in dependence on a cyclic prefix length associated with transmitting the signals to the serving base station using the set value for the transmission time offset.

10. The method as claimed in claim 1, wherein transmitting the signals to the serving base station comprises transmitting the signals to the serving base station further responsive to determining that data to be transmitted has a high priority.

11. The method as claimed in claim 1, wherein transmitting the signals to the serving base station comprises transmitting the signals to the serving base station further only within a predetermined time period after receiving a timing advance command.

12. The method as claimed in claim 1, wherein transmitting the signals to the serving base station comprises transmitting the signals to the serving base station further only when explicitly signaled by the serving base station.

13. The method as claimed in claim 1, wherein obtaining the timing information from the at least one other base station comprises detecting a timing signal from each of the at least one other base station, and wherein transmitting the signals to the serving base station comprises transmitting the signals to the serving base station further only when, for purposes of setting the value of the transmission time offset, the device was able to detect timing signals from at least a predetermined number of other base stations with a signal strength at least equal to a predetermined signal strength.

14. The method as claimed in claim 1, further comprising reporting the set value for the transmission time offset to the serving base station.

15. A user equipment device, for use in a cellular communications network, the user equipment device comprising:

communication circuitry configured for communicating with base stations in the cellular communications network; and processing circuitry operatively associated with the communication circuitry and configured to:

detect a timing signal from a serving base station;

obtain timing information from at least one other base station;

set a value for a transmission time offset based on the detected timing signal from the serving base station and the timing information obtained from the at least one other base station; and transmit signals to the serving base station using the set value for the transmission time offset, wherein to transmit the signals to the serving base station, the processing circuitry is configured to transmit the signals to the serving base station with a power that is determined based on an uncertainty in the set value for the transmission time offset.

16. The user equipment device as claimed in claim 15, wherein the processing circuitry is configured to obtain the timing information from the at least one other base station by detecting a timing signal transmitted by the at least one other base station.

17. The user equipment device as claimed in claim 16, wherein the processing circuitry is configured to set the value for the transmission time offset based on the detected timing signals from the serving base station and the at least one other base station by determining a timing difference between the detected timing signals from the serving base station and the at least one other base station.

18. The user equipment device as claimed in claim 17, wherein the processing circuitry is configured to set the value for the transmission time offset based on the detected timing signals from the serving base station and the at least one other base station further by subtracting the timing difference between the detected timing signals from the serving base station and the at least one other base station from a predetermined baseline time offset; and setting the value of the transmission time offset based on a resulting value of the subtraction.

19. A method of operation of a base station in a cellular communications network, the method comprising:

instructing a device to: detect a timing signal from the base station; obtain timing information from at least one other base station; set a value for a transmission time offset based on the detected timing signal from the base station and the timing information from the at least one other base station; and transmit signals to the base station using the set value for the transmission time offset, wherein instructing the device to transmit the signals to the base station comprises instructing the device to transmit the signals to the base station with a power that is determined based on an uncertainty in the set value for the transmission time offset.

20. The method as claimed in claim 19, further comprising instructing the device by means of a broadcast message.

21. The method as claimed in claim 19, further comprising instructing the device by means of dedicated signaling.

22. A base station for use in a cellular communications network, the base station comprising:

communication circuitry configured for communicating with a device; and processing circuitry operatively associated with the communication circuitry and configured to:

instruct the device to: detect a timing signal from the base station; obtain timing information from at least one other base station; set a value for a transmission time offset based on the detected timing signal from the base station and the timing information from the at least one other base station; and transmit signals to the base station using the set value for the transmission time offset, wherein to instruct the device to transmit the signals to the base station, the processing circuitry is configured to instruct the device to transmit the signals to the base station with a power that is determined based on an uncertainty in the set value for the transmission time offset.

23. A non-transitory computer-readable storage medium storing a computer program containing instructions that when executed by a processor of a device cause the device to:
- detect a timing signal from a serving base station;
- obtain timing information from at least one other base station;
- set a value for a transmission time offset based on the detected timing signal from the serving base station and the timing information obtained from the at least one other base station; and
- transmit signals to the serving base station using the set value for the transmission time offset, wherein to transmit the signals to the serving base station, the instructions cause the device to transmit the signals to the serving base station with a power that is determined based on an uncertainty in the set value for the transmission time offset.

24. A non-transitory computer-readable storage medium storing a computer program containing instructions that when executed by a processor of a base station cause the base station to:
- instruct a device to: detect a timing signal from the base station; obtain timing information from at least one other base station; set a value for a transmission time offset based on the detected timing signal from the base station and the timing information from the at least one other base station; and transmit signals to the base station using the set value for the transmission time offset, wherein to transmit the signals to the base station, the instructions cause the base station to instruct the device to transmit the signals to the base station with a power that is determined based on an uncertainty in the set value for the transmission time offset.

* * * * *